United States Patent [19]

MacLeod

[11] 4,381,633
[45] May 3, 1983

[54] MOUNTING ORNAMENTAL WINDOW SHUTTERS

[75] Inventor: Richard J. MacLeod, Milford, Mich.

[73] Assignee: Tapco Products Company, Inc., Detroit, Mich.

[21] Appl. No.: 187,962

[22] Filed: Sep. 17, 1980

Related U.S. Application Data

[63] Continuation-in-part of Ser. No. 52,672, Jun. 27, 1979, abandoned.

[51] Int. Cl.³ .................... E06B 7/08; F16B 19/00
[52] U.S. Cl. .......................................... 52/473; 52/741; 411/508; 411/509; 411/510
[58] Field of Search ............... 52/473, 741; 411/508, 411/509, 510

[56] References Cited

U.S. PATENT DOCUMENTS

| | | |
|---|---|---|
| 2,780,128 | 2/1957 | Rapata . |
| 2,927,497 | 3/1960 | Rapata . |
| 3,139,784 | 7/1964 | Moorman . |
| 3,455,079 | 7/1969 | Frederick ............................. 52/473 |
| 3,494,244 | 2/1970 | Wayland ............................. 411/510 |
| 3,584,427 | 6/1971 | Johnston ............................. 52/473 |
| 3,810,279 | 5/1974 | Swick et al. ........................ 411/509 |
| 4,287,657 | 9/1981 | Andre et al. .................. 24/213 R X |

FOREIGN PATENT DOCUMENTS 2334869  7/1977  France .
 568497 10/1975  Switzerland .

Primary Examiner—Alfred C. Perham
Attorney, Agent, or Firm—Barnes, Kisselle, Raisch, Choate, Whittemore & Hulbert

[57] ABSTRACT

The combination of a decorative non-functional window shutter and a one-piece plastic fastener, and a method of mounting the same to a building wall. The shutter is made of molded plastic or aluminum. The fastener is of non-corrosive plastic construction having a plurality of angled resiliently-deformable teeth which, when inserted through a hole in the shutter into a mounting hole formed in a building wall, tend to flex in the direction of insertion and tend to return to their original position to resist removal.

13 Claims, 11 Drawing Figures

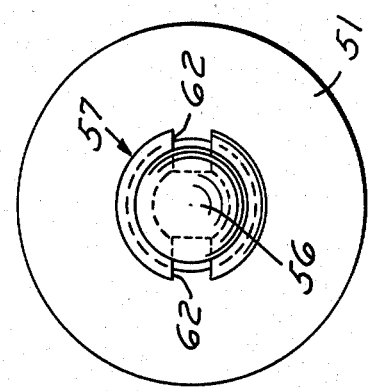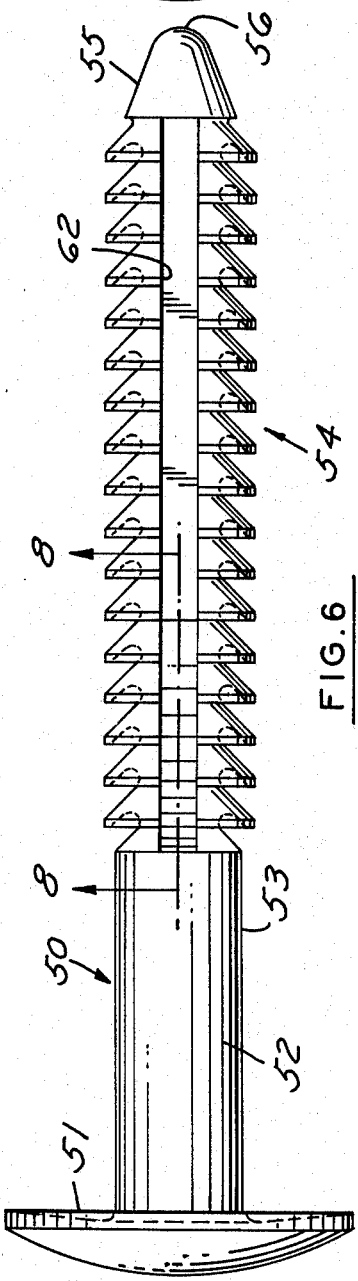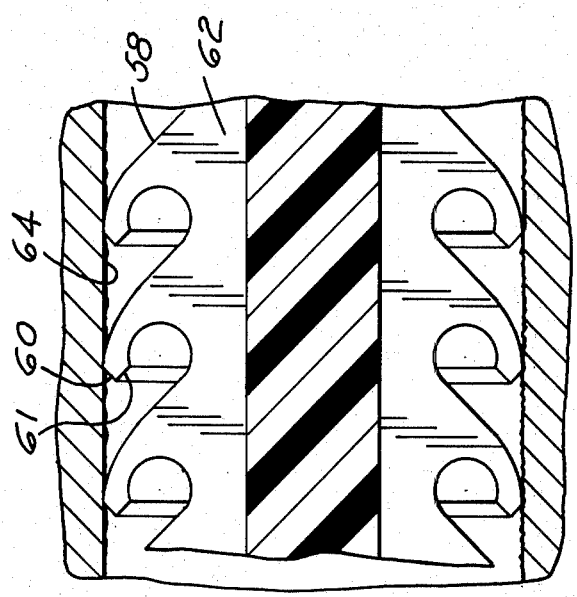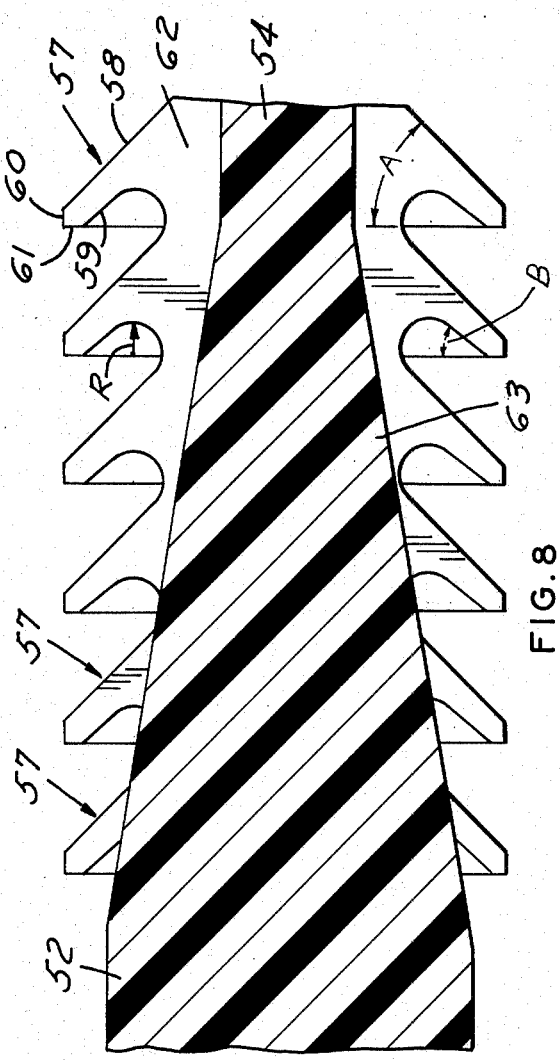
FIG. 6
FIG. 7
FIG. 8
FIG. 9

MOUNTING ORNAMENTAL WINDOW SHUTTERS

This application is a continuation-in-part of co-pending application Ser. No. 052,672, filed June 27, 1979, now abandoned.

The present invention is directed to building trim construction, and more particularly to attachment of decorative non-functional window shutters to building exterior surfaces.

BACKGROUND AND SUMMARY OF THE INVENTION

Decorative non-functional window shutters of ornamental light-weight construction such as aluminum or molded plastic are frequently used for building trim in both residential and commercial construction. Such shutters are typically mounted by drilling holes in the building exterior wall surface, which may be brick, masonry or siding such as aluminum, vinyl or wood, inserting a plastic or lead anchor if required, as in masonry, into the drilled opening and then threading an aluminum or steel screw through the shutter and into the anchor. The anchor itself and the time consuming requirement of threading each screw into its associated anchor both add substantial cost to the overall assembly process. Furthermore, steel screws have a tendency to corrode which lends an unsightly appearance to the trim structure. Aluminum or painted screws and plastic caps have been proposed to cover the screw heads to eliminate the problem of unsightly corrosion. However, such proposals add additional expense to the trim structure. Furthermore, the paint and caps have a tendency to come off.

Among the objects of the present invention are to provide a shutter mounting arrangement which is much faster and more economical both in fabrication and assembly, which is not subject to unsightly corrosion and which is color coordinated by permanently molding the color in the fasteners. A further object of the invention is to provide a shutter mounting kit for aftermarket installation on previously-constructed homes which is inexpensive and which may be readily assembled to any building wall by unskilled personnel.

Another problem which is encountered with respect to mounting plastic or aluminum shutters results from current building construction wherein a thick outer layer of insulation is provided on the exterior of the building studs. When typical screws supplied with the shutters are used, one or more of the screws may be sometimes of insufficient length so that they do not engage the studs. The person mounting the shutters may not realize this and, as a result, the shutters are not mounted so that they withstand the elements including wind.

Accordingly, an object of this invention is to provide a mounting structure and method which will obviate such problems.

The invention, together with additional objects, features and advantages thereof, will be best understood from the following description, the appended claims and the accompanying drawings in which:

DESCRIPTION OF THE DRAWINGS

FIG. 6 is a view on an enlarged scale of another embodiment of fastener;

FIG. 7 is an end view of the fastener shown in FIG. 6;

FIG. 8 is a fragmentary sectional view on an enlarged scale taken along the line 8—8 in FIG. 6;

FIG. 9 is a fragmentary sectional view on an enlarged scale showing the fastener in a brick wall;

DESCRIPTION

Figure 1:
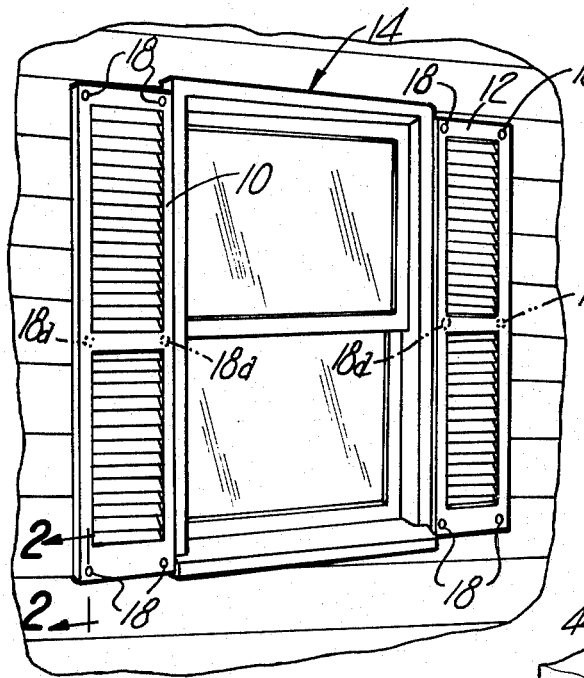
FIG. 1 is a fragmentary perspective view in front elevation of decorative window shutters mounted in accordance with the invention.
Figure 2:
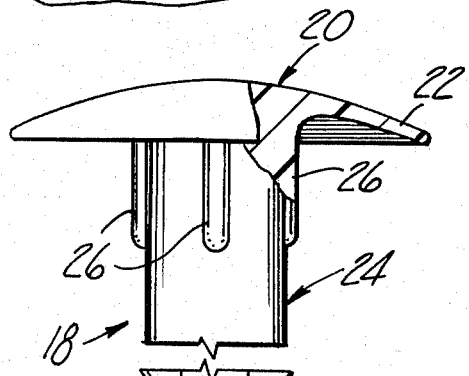
FIG. 2 is a fragmentary sectional view on an enlarged scale taken along the line 2—2 in FIG. 1.

FIG. 1 illustrates a residential window 14 flanked by a pair of decorative non-functional window shutters 10, 12. "Non-functional" means that shutters 10, 12 are rigidly and fixedly mounted to the building wall 16 for decorative purposes only and do not pivot inwardly over the window to function as a protective window closure. Each shutter 10, 12 is mounted by a plurality of fasteners 18, one disposed in each corner of the generally rectangular shutter outline. As best seen in FIG. 2 shutter 10 (and also shutter 12) are of generally hollow molded plastic construction having internal strengthening ribs (not shown) and made for example from polystyrene or polypropylene. Aluminum shutters, although somewhat more expensive, are light-weight and relatively maintenance free, and are also contemplated in accordance with the invention although not shown in the drawing.

Figure 4:
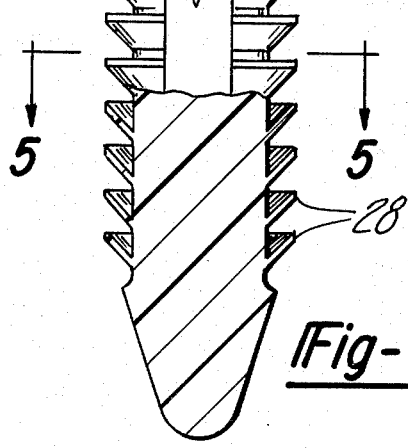
FIG. 4 is a broken part sectional elevational view of the shutter mounting fastener provided in accordance with the invention on a substantially enlarged scale as compared with FIGS. 2 and 3.
Figure 5:
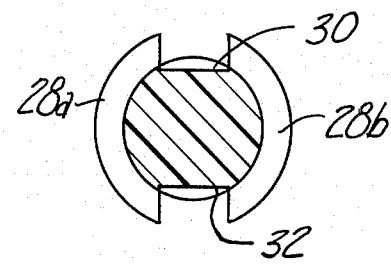
FIG. 5 is a sectional view taken along the line 5—5 in FIG. 4.

The shutter mounting fastener 18 provided in accordance with the invention and best seen in FIGS. 2 and 4-5 is of one piece non-corrosive molded plastic construction such as polypropylene, polycarbonate or nylon, for example. The fasteners are color coordinated or matched to the color of the shutters with which they are to be used. Fastener 18 includes a convex or button-shaped head portion 20 and depends from head portion 20. A skirt 22 radiates for clamping engagement with an opposing surface of shutters 10, 12 (FIG. 2). Depending skirt 22 is of particular importance in that it resiliently cushions the driving blows or head portion 20 from the shutter surface as the fastener is driven into the wall. A solid shank portion 24 integrally extends coaxially from head portion 20, with a circumferential array of four axially extending strengthening ribs 26 joining the head and shank portions of fastener 18. A plurality of resiliently deformable axially spaced integral teeth extend radially outwardly from the solid shank portion 24 and are angled or sloped axially in the direction of head portion 20. A pair of radially opposed outwardly facing generally rectangular slots or channels 30, 32 are formed in the external surface of solid cylindrical shank portion 24 and effectively separate teeth 28 into circumferentially discontinuous tooth pairs 28a and 28b as best seen in FIG. 5.

Teeth 28 are generally uniform in thickness, as best seen in FIG. 4, with each tooth pair 28a, 28b being formed in a common cone of revolution coaxial with shank portion 24 and having a preferred included angle in the direction of head 20 of substantially ninety degrees. In an embodiment of the invention drawn to scale in FIG. 2 and having an overall length of 2.500 inches, there are seventeen teeth 28 having an outside diameter of 0.300 inches. Channels 30, 32 have a width of 0.090 inches and a depth measured from the peak of a circular arc joining tooth segments 28a, 28b of 0.085 inches. Each tooth segment 28a, 28b extends over an arc of 130°–135°.

In accordance with an important advantage of the present invention, a pair of shutters 10, 12 and a plurality of fasteners 18 may be provided in the form of a kit suitable for aftermarket purchase and installation onto an existing home. Such a kit may include four fasteners 20 for each shutter 10 or 12 up to sixty inches in length and six fasteners for each shutter in the range of sixty-four to seventy-nine inches in length, the additional fastener supporting the mid-portion of the larger shutters as illustrated in phantom at 18a in FIG. 1. The fasteners 18 in each kit are color coded to match the shutters, the color dye being molded throughout the fastener body. Alternately, of course, the shutters and fasteners may be purchased in quantity by a building contractor for installation during initial construction. In either, event, mounting apertures are formed in the shutters either during shutter fabrication or on the job site. Holes are then drilled in the building wall for alignment with the preformed apertures in the shutters. When the shutters are provided as a kit, a template may be printed on the shipping carton with suitable knockouts for locating the mounting holes. Alternatively, the shutters themselves may be used as templates, with hole location being marked on the building wall using a scribe or the like. The mounting holes are then drilled in the building wall using a drill having a diameter slightly smaller than the outside diameter of teeth 28 on the fastener. When using the preferred embodiment of the invention having a 0.300 outside diameter, a 0.250 inch diameter drill bit is suitable.

The shutters are then located with apertures aligned with the predrilled mounting holes and the fasteners 18 are inserted by interference press fit either by hand or with light tapping from a hammer. During such force fit insertion, the teeth 28 resiliently deform or collapse inwardly into the spaced between the teeth. Slots 30, 32 provide enhanced flexibility to teeth 28 during insertion. However, the teeth by their resilient nature will tend to expand and dig into the opposing surface of the mounting hole when subjected to an extraction or removal force, which inherently tends to resist removal of the fasteners from the mounting holes. Thus, in FIG. 2, for example, the teeth 28 are resiliently deformed as they pass through the section of aluminum siding illustrated at 40, assume their initial orientation when passing through the air gap 42, and are again resiliently collapsed when passing through the backing 44.

It has been found that the spring teeth provide good retention even in connection with a relatively thin section of aluminum siding as at 40, although deeper penetration as through the thickness of backing 44 is preferred. The invention is particularly useful for mounting directly to brick or masonry as at 46 in FIG. 3 wherein all or a substantial number of the teeth resist removal of the fastener from the mounting hole.

Figure 3:
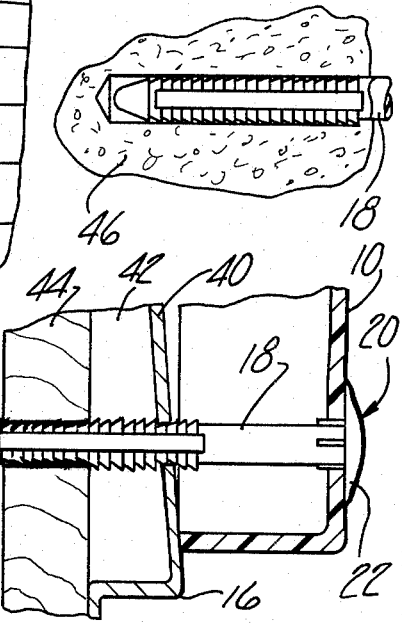
FIG. 3 is a fragmentary part sectional view similar to FIG. 2 of an alternative mounting arrangement.

It will be recognized that the invention is not limited to the particular wall structures illustrated in FIGS. 2 and 3, i.e. aluminum siding and backing in FIG. 2 and masonry or brick as in FIG. 3. The invention has been tested using vinyl siding in place of aluminum siding 40 in FIG. 2, and may be used where backing 44 is of wood or is replaced by slats of styrofoam insulation or the like. Steel and hardboard exterior surfaces are also compatible. Similarly, it is conceivable that the fasteners 18 may be used for mounting wood shutters. However, the weight, expense and upkeep required of wood shutters render the same less desirable that plastic or aluminum.

In the form of fastener shown in FIGS. 6–9, the fastener 50 comprises a head portion 51, a first cylindrical body portion 52 extending from the head portion 51 and having a smooth peripheral surface 53 and a second body portion 54 having a lesser diameter than the first portion 52 terminating in a conical end 55 having a greater base diameter than the second body portion and having a rounded end 56.

A plurality of pairs of teeth 57 extend at an acute angle from the second body portion 54 toward the head portion 51. Each tooth 57 has a generally uniform thickness and adjacent teeth are connected to one another by a radius R so that each tooth has one long surface or side 58 and one short surface or side 59. The end of each tooth is formed with an axial surface 60 and a radial surface 61, the latter extending to the short side.

The sides 58 of each pair of teeth lie in a common cone and the sides 59 of each pair of teeth lie in a common cone.

Each side 58, 59 forms an acute angle with a transverse radial plane through the fastener, the side 58 forming a greater angle A with a radial plane than the angle B formed by the side 59.

The spaced pairs of teeth 57 are separated by a groove 62.

In order to prevent bending of the fastener adjacent the head portion during insertion in an opening, a rib 63 is provided in the groove 62 extending from the periphery of the outer surface 53 of the first portion 52 and tapering longitudinally toward the surface of the second body portion 54.

In use, the fastener 50 is applied as previously described. As the fastener is inserted through the previously formed openings in the shutter, each tooth 57 flexes radially inwardly. As each tooth passes the opening it flexes radially outwardly behind the wall of the fastener. As the teeth of the fastener enter the opening 64 the wall of the building, for example the brick wall shown in FIG. 9, the teeth 57 are flexed radially inwardly with a portion of the surface 58 yieldingly engaging the side of the opening 63.

Figure 10:
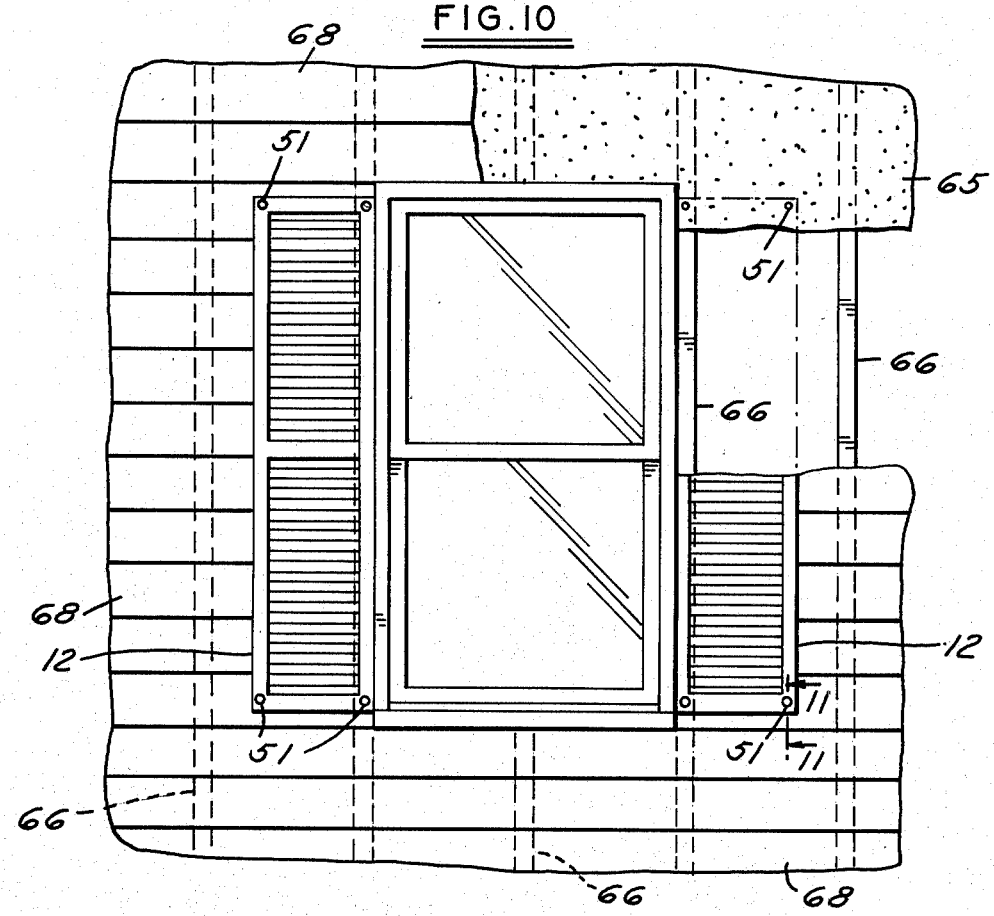
FIG. 10 is a fragmentary elevational view of a building on which shutters are to be mounted.
Figure 11:
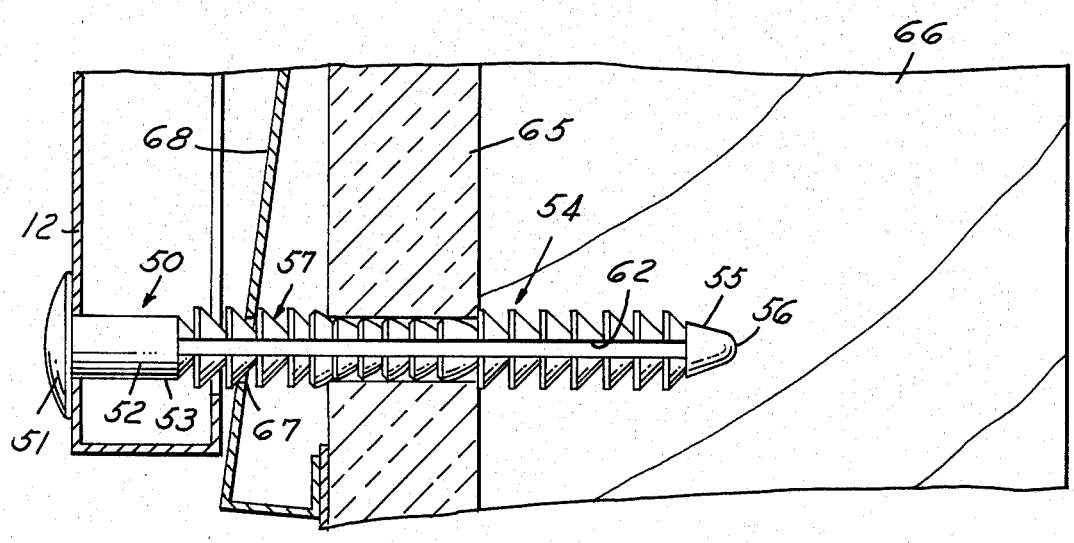
FIG. 11 is a fragmentary sectional view on an enlarged scale taken along the line 11—11 in FIG. 10.

In a preferred form, the fastener shown in FIG. 9, is made of polypropylene and has the following dimensions:

overall length 2.500±0.10 inches
diameter of head portion 0.700 inch
length of first portion 50 0.880 inch
length of second portion 54 1.360 inches
length of end 55 0.180 inch
diameter of end 0.260 inch
radius of end 0.064 inch
length of last tooth adjacent end 55 0.080 inch
diameter of first portion 50 0.300 inch
diameter of second portion 54 0.260 inch
outer diameter of teeth 0.335 inch
distance between teeth 0.085 inch number of teeth 17
radius R 0.020 inch
angle A 45°
angle B 40°
diameter of opening in wall ¼ inch
diameter of opening in shutter ¼ inch Referring to FIGS. 10 and 11, in one type of building construction currently used, a layer 65 of semirigid foam or cellular insulating material is provided over the vertical studs 66. The distance between studs 66 is typically 16 inches and the width of shutters is 12 inches to 14 inches so it is likely that at least some of the fasteners will not engage a stud. In such event, the fasteners embodying the invention will still provide a secure mounting because at least one pair of teeth 57 will flex thru the opening 67 in the siding wall 68 and then flex out behind the wall 68 of the siding because the longitudinal spacing between teeth is greater than the thickness of the siding wall 68. In addition there will be some limited frictional engagement with the layer 65.

I claim:

1. In building trim construction, the combination comprising a decorative non-functional window shutter of ornamental lightweight construction such as aluminum or plastic and having a plurality of mounting openings, and a one-piece fastener of non-corrosive plastic construction adapted to be received by interference press fit in a preformed hole in a building wall for rigidly mounting said shutter,
   said fastener comprising a body,
   said body including a head portion, a first portion extending from said head, a second portion extending from said first portion and a free end portion,
   said second portion being formed with longitudinally spaced pairs of diametrically opposed teeth separated by slots and extending radially outwardly from a base and axially toward said head portion,
   the circumferential extent of each tooth being greater than ninety degrees,
   each said tooth being of generally uniform thickness and extending toward said head portion at an acute angle,
   adjacent teeth being connected to one another at said base by a curved portion,
   the length and axial spacing of said teeth being such that each tooth can flex radially inwardly independently of the adjacent tooth as the fastener is forced through the openings and will flex back to its original position after passing through the opening in the shutter without deforming the opening and will thereafter yieldingly engage the sides of said opening in the building without deforming said opening,
   each said tooth comprising an outer surface and an inner surface,
   said outer surface of each said tooth lying in a conical plane and said inner surface of each said tooth lying in a conical plane,
   the outer surface of one tooth being joined to the inner surface of the adjacent tooth,
   said conical plane of said outer surface forming a greater angle with a radial plane than the angle of said conical plane of said inner surface forms with a radial plane,
   each said tooth having an axial peripheral surface,
   each said tooth having a radial surface extending inwardly from said axial surface to said inner surface.

2. The combination set forth in claim 1 wherein said outer surface of each said tooth lying in a conical plane forms an angle of substantially 40° with a radial plane,
   said inner surface of each said tooth lying in a conical plane forming an angle of substantially 40° with a radial plane.

3. The combination set forth in claim 1 or 2 wherein said fastener has a conical free end, the maximum diameter of said conical free end being greater than the diameter of said second portion.

4. The combination set forth in claim 3 wherein said fastener includes a tapered surface in each slot extending from the periphery of the outer surface of the first portion and tapering toward the periphery of the surface of the second portion.

5. A fastener for insertion through aligned openings in a non-functional decorative shutter and a portion of a building to support the shutter which comprises
   a one-piece body of plastic material,
   said body including a head portion, a first portion extending from said head, a second portion extending from said first portion and a free end portion,
   said second portion being formed with longitudinally spaced pairs of diametrically opposed teeth extending radially outwardly from a base and axially toward said head portion,
   the circumferential extent of each tooth being greater than ninety degrees,
   each said tooth being of generally uniform thickness and extending toward said head portion at an acute angle,
   adjacent teeth being connected to one another at said base by a curved portion,
   the length and axial spacing of said teeth being such that each tooth can flex radially inwardly independently of the adjacent tooth as the fastener is forced through the openings and will flex back to its original position after passing through the opening in the shutter without deforming the opening and will thereafter yieldingly engage the sides of said opening in the building without deforming said opening,
   each said tooth comprising an outer surface and an inner surface,
   said outer surface of each said tooth lying in a conical plane and said inner surface of each said tooth lying in a conical plane,
   the outer surface of one tooth being joined to the inner surface of the adjacent tooth,
   said conical plane of said outer surface forming a greater angle with a radial plane than the angle of said conical plane of said inner surface forms with a radial plane,
   each said tooth having an axial peripheral surface,
   each said tooth having a radial surface extending inwardly from said axial surface to said inner surface.

6. The fastener set forth in claim 5 wherein said outer surface of each said tooth lying in a conical plane forms an angle of substantially 45° with a radial plane,
   said inner surface of each said tooth lying in a conical plane forming an angle of substantially 40° with a radial plane.

7. The fastener set forth in claim 6 wherein said fastener has a conical free end, the maximum diameter of said conical free end being greater than the diameter of said second portion.

8. The fastener set forth in claim 7 wherein said fastener includes a tapered surface in each slot extending from the periphery of the outer surface of the first portion and tapering toward the periphery of the surface of the second portion.

9. A kit for mounting ornamental non-functional residential shutters consisting essentially of a pair of decorative shutters of lightweight ornamental construction such as aluminum or plastic and at least eight one-piece fasteners of weather resistant plastic construction, each said fastener comprising a one-piece body of plastic material, said body including a head portion, a first portion extending from said head, a second portion extending from said first portion and a free end portion, said second portion being formed with longitudinally spaced pairs of diametrically opposed teeth separated by slots and extending radially outwardly from a base and axially toward said head portion, the circumferential extent of each tooth being greater than ninety degrees, each said tooth being of generally uniform thickness and extending toward said head portion at an acute angle, adjacent teeth being connected to one another at said base by a curved portion, the length and axial spacing of said teeth being such that each tooth can flex radially inwardly independently of the adjacent tooth as the fastener is forced through the openings and will flex back to its original position after passing through the opening in the shutter without deforming the opening and will thereafter yieldingly engage the sides of said opening in the building without deforming said opening, each said tooth comprising an outer surface and an inner surface, said outer surface of each said tooth lying in a conical plane and said inner surface of each said tooth lying in a conical plane, the outer surface of one tooth being joined to the inner surface of the adjacent tooth, said conical plane of said outer surface forming a greater angle with a radial plane than the angle of said conical plane of said inner surface forms with a radial plane, each said tooth having an axial peripheral surface, each said tooth having a radial surface extending inwardly from said axial surface to said inner surface.

10. The combination set forth in claim 9 wherein said outer surface of each said tooth lying in a conical plane forms an angle of substantially 45° with a radial plane, said inner surface of each said tooth lying in a conical plane forming an angle of substantially 45° with a radial plane.

11. The combination set forth in claim 10 wherein said fastener has a conical free end, the maximum diameter of said conical free end being greater than the diameter of said second portion.

12. The combination set forth in claim 11 wherein said fastener includes a tapered surface in each slot extending from the periphery of the outer surface of the first portion and tapering toward the periphery of the surface of the second portion.

13. A method of mounting a decorative shutter to an external residential wall comprising the steps of
(a) providing a shutter of lightweight decorative construction and having a plurality of mounting holes extending transversely therethrough,
(b) providing a plurality of one-piece fasteners of non-corrosive resilient plastic construction, each said fastener comprising a one-piece body of plastic material, said body including a head portion, a first portion extending from said head, a second portion extending from said first portion and a free end portion, said second portion being formed with longitudinally spaced pairs of diametrically opposed teeth extending radially outwardly from a base and axially toward said head portion, the circumferential extent of each tooth being greater than ninety degrees, each said tooth being of generally uniform thickness and extending toward said head portion at an acute angle, adjacent teeth being connected to one another at said base by a curved portion, the length and axial spacing of said teeth being such that each tooth can flex radially inwardly independently of the adjacent tooth as the fastener is forced through the openings and will flex back to its original position after passing through the opening in the shutter without deforming the opening and will thereafter yieldingly engage the sides of said opening in the building without deforming said opening, each said tooth comprising an outer surface and an inner surface, said outer surface of each said tooth lying in a conical plane and said inner surface of each said tooth lying in a conical plane, the outer surface of one tooth being joined to the inner surface of the adjacent tooth, said conical plane of said outer surface forming a greater angle with a radial plane than the angle of said conical plane of said inner surface forms with a radial plane, each said tooth having an axial peripheral surface, each said tooth having a radial surface extending inwardly from said axial surface to said inner surface, wherein said fastener has a conical free end, the maximum diameter of said conical free end being greater than the diameter of said second portion, said fastener including a tapered surface in each slot extending from the periphery of the outer surface of the first portion and tapering toward the periphery of the surface of the second portion,
(c) forming a plurality of mounting holes of preselected diameter less than said predetermined diameter in said wall at locations corresponding to locations of said mounting holes in said shutters,
(d) positioning said shutter over said wall such that mounting holes in said shutters align with mounting holes formed in said wall, and
(e) inserting each of said fasteners into a corresponding pair of aligned mounting holes in said shutter and said wall by interference press fit until said head portion clamps said shutter against said wall such that said teeth flex in the direction of said head portion by the opposing surfaces of said formed hole during insertion into said formed hole and resiliently engage said opposing surface so as to resist removal from said formed hole.

* * * * *